April 1, 1958  KENICHI ODA ET AL  2,829,095
PROCESS FOR THE PRODUCTION OF ACIDIC AND
ALKALINE SOLUTION FROM SALT SOLUTION
BY MULTI-COMPARTMENT ELECTROLYSIS
Filed Aug. 23, 1956
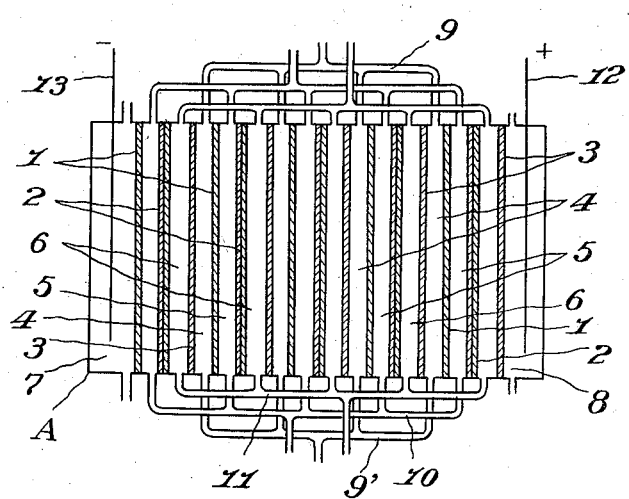
INVENTORS
K. Oda
BY M. Murakoshi
ATTYS.

2,829,095
Patented Apr. 1, 1958

2,829,095

PROCESS FOR THE PRODUCTION OF ACIDIC AND ALKALINE SOLUTION FROM SALT SOLUTION BY MULTI-COMPARTMENT ELECTROLYSIS

Kenichi Oda and Masahiko Murakoshi, Itabashi-ku, Tokyo-to, Japan, assignors to Noguchi Kenkyu-jo, Tokyo-to, Japan Application August 23, 1956, Serial No. 605,895

Claims priority, application Japan September 3, 1955

5 Claims. (Cl. 204—98)

An essential object of this invention is to produce acidic and alkaline solutions from any salt solution by utilization of only the simple electrolysis without necessitating any auxiliary chemicals.

Said object and other objects of this invention have been accomplished by a process which comprises arranging successively a plurality of membrane groups in an electrolytic cell, each group consisting of an anion exchange membrane, a cation exchange membrane and an anion exchange membrane of an acid-base double membrane, and a cation exchange membrane which are successively arranged in parallel in the above-mentioned order so as to form electrolytic compartment between each membrane and its adjacent membrane and carrying out electrolysis by feeding direct electric current from an electrode arranged at one end compartment of said electrolytic cell to the other electrodes arranged at the other end compartment of said cell, said current being directed from the anion exchange membrane side of the double membrane towards the cation exchange membrane side of said double membrane, while charging the starting salt solution into the electrolytic compartments formed between the anion and cation exchange membranes, thus producing acidic solution in each electrolytic compartment formed between the anion exchange membrane and the double membrane and alkaline solution in each electrolytic compartment formed between the double membrane and the cation exchange membrane.

The novel features of this invention are set forth with particularity in the appended claims. This invention, however, both as to its principle and reaction manner may best be understood in reference to the following description, taken in connection with the accompanying drawing, in which:

An anion exchange membrane 1, a double membrane 2 composed of cation and anion exchange membranes, and a cation exchange membrane 3 are grouped and a plurality of said groups are successively arranged in an electrolytic cell A, whereby electrolytic compartment is formed between each membrane and its adjacent membrane. Starting salt solution is charged into the electrolytic compartments 4 formed between anion exchange membranes 1 and cation exchange membranes 3 from one side of the electrolytic cell A by means of a pipe-set 9 and led out from another side of said cell by means of a pipe-set 9'.

When a direct electric current is passed from the anode 12 in the compartment 8 to the cathode 13 in the compartment 7 through the electrolyte so as to carry out electrolysis, acid solution is produced in each electrolytic compartment 5 (hereinafter will be denoted merely as acid compartment) formed between the double membrane and the cation exchange membrane and alkaline solution is produced in each electrolytic compartment 6 (hereinafter will be denoted merely as alkaline compartment) formed between the double membrane and the cation exchange membrane. Said acidic and alkaline solutions produced are, respectively, led out by pipe-sets 10 and 11.

In this invention, the double membrane composed of cation and anion exchange membranes being made to be close together plays an important part in performance of the objects of this invention. The function of said double membrane is as follows. Now, it is assumed that the double membrane is impregnated with NaCl or the anion and cation exchange membranes of said double membrane are, respectively, in conditions of $R^+Cl^-$ and $R^-Na^+$ ($R^+$ represents the ionized radical of cation exchange resin and $R^-$ represents the ionized radical of anion exchange resin). Under said assumption, when a direct electric current is passed through said double membrane from its anion exchange membrane side to its cation exchange membrane side, ions $Cl^-$ move towards the direction inverse to that of the current and ions $Na^+$ move towards the direction of the current, whereby the double membrane is deprived of ions $Na^+$ and $Cl^-$ reaching conditions of $R^+OH^-$ and $R^-H^+$. When said conditions are reached, transfer of $OH^-$ and $H^+$ occurs, and such dissociation as represented by the following equation progresses at the contact surface

$$H_2O \rightarrow OH^- + H^+$$

between the cation and anion exchange membranes of the double membrane, whereby supplement of ions $OH^-$ and $H^+$ is carried out. That is to say, the double membrane carries out such dissocation as represented by the above equation by dint of electricity and reducement of water due to said dissociation is supplemented at the contact surface between both membranes of the double membrane by means of diffusion from outside.

The anion exchange membrane and cation exchange membrane adjacent to the double membrane take part in respective transfer of corresponding anion and cation, that is to say, ion $Cl^-$ and ion $Na^+$ when NaCl is used as the starting material. Accordingly, the acid compartment is supplied with ions $H^+$ from the cation exchange membrane side of the double membrane and with ions $Cl^-$ from the salt compartment through the anion exchange membrane, whereby solution of HCl is produced in said acid compartment. On the other hand, the alkaline compartment is supplied with ions $OH^-$ from the anion exchange membrane side of the double membrane and with ions $Na^+$ from the salt compartment through the cation exchange membrane, whereby solution of NaOH is produced in said alkaline compartment.

As described above, while in any usual electrolysis is produced $H_2$ and $Cl_2$ as well as NaOH from NaCl, according to the process of this invention there is an advantage that NaOH and HCl are directly obtained. Moreover, the process of this invention is effectively applicable to any other salt solution besides NaCl solution to obtain directly both acid and base.

The process of this invention can carry out electrolysis efficiently even when diluted solution is used.

Electric voltage necessary for the electrolysis according to this invention is the resultant of an electric voltage necessary for the decomposition of $H_2O$

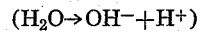

$$(H_2O \rightarrow OH^- + H^+)$$

membrane potentials of anion exchange membrane and cation exchange membrane, and resistance drops in the solution and membranes. Among them, main consumer of the electric energy is the voltage necessary for the decomposition of $H_2O$ and about 0.80 volt is necessary for the production of $H^+$ of 1 N and $OH^-$ of 1 N. Since the double membrane composed of cation and anion exchange membranes should predominate the produced acid and alkali so as to hold always ions $H^+$ and $OH^-$, favorable result will be usually obtained when strongly acidic or basic membrane is used. Phenolsulphonic resin and styrol sulphonic resin are used as strong acidic cation exchange membrane and resin containing quarternary amine is used as the strong basic anion exchange membrane.

Ions $Na^+$ and $Cl^-$ progressively penetrate, respectively, in the anion exchange membrane and the cation exchange membrane with the progressive thickening of acid and base, said phenomenon being due to so-called Donnan's equilibrium. In the electrolysis course, said penetrated ions $Na^+$ and $Cl^-$ move towards contact surface of double membrane in the direction reverse to the movement of the ions $OH^-$ and $H^+$, whereby function of the electric current is reduced. Furthermore, said ions $Na^+$ and $Cl^-$ which have reached to said contact surface of double membrane pass easily, respectively, through the cation and the anion exchange membranes, resulting in further reduction of the function of the electric current. As a whole, efficiency of the reaction $(H_2O \rightarrow H^+ + OH^-)$ at the double membrane is reduced remarkably with the increase of the concentrations of ions $H^+$ and ions $OH^-$. Accordingly, it is not preferable to use concentrated solution.

Next, referring to cation and anion exchange membranes participating in transference of cation and anion in the salt compartment, when NaCl is supplied into salt compartment, both kinds of said membranes are in contact with ions $Na^+$, $H^+$ and $Cl^-$ or $Cl^-$, $OH^-$ and $Na^+$. Therefore, it is preferable to use anion exchange membrane having an excellent permselectivity for ions $Cl^-$ and cation exchange membrane having an excellent permselectivity for $Na^+$. In the alkaline condition, the weakly acidic membrane has a larger permselectivity than that of strongly acidic membrane, while in the neutral condition, the latter has larger permselectivity than the former. In the acidic condition, the weakly basic membrane has a smaller permselectivity than that of the strongly basic membrane, while in the neutral condition, the former has smaller permselectivity than the latter. When the favorable conditions as stated above are given, a better permselectivity is found in case weakly acidic or basic membrane is used than in case strongly acidic or basic membrane is used. Said properties are based on the fact that, generally, the ion exchange capacity of weakly basic or weakly acidic ion exchange resins is larger than that of strongly basic or strongly acidic ion exchange resins.

It has been found that in the anion exchange membrane having one acidic side and the other neutral side or in the cation exchange membrane having one alkaline side and the other neutral side, basic or acidic intensities of these membranes have a relation to actual condition.

Although the double membrane composed of cation and anion exchange membranes is effective even when said two elemental membranes are merely brought in contact with each other, it is preferable to bring said elemental membranes in close contact or to adhere said elemental membranes by any suitable adhering agent having ion exchangeability, because when said elemental membranes are merely brought in contact, the occurrence of water layer between said membranes and increase of electric resistance of the double membrane are unavoidable. An ion exchangeable agent such as polyethyleneimine-epichlorhydrine resin can be used as said adhering agent.

As described above, according to this invention, acidic and alkaline solution can be obtained from any one of all kinds of salt solutions and particularly this invention can be embodied with high efficiency even when diluted solution is used as the starting solution. Furthermore, the process of this invention is applicable for direct production of NaOH and HCl from sea water, for the direct production of NaOH and $H_2SO_4$ from Glauber's salt and for other objects, so that this invention can be applied to various uses and brings large industrial effect.

When salt of weak acid such as organic acid or salt of weak base such as ammonia or amine is electrolized according to this invention, concentrations of ions $H^+$ in acid compartment in case of the former salt and concentration of ions $OH^-$ in alkaline compartment in case of the latter salt are relatively low, so that efficiency of the double membrane for the decomposition of $H_2O$ is high and inverse flowing of ions $H^+$ or $OH^-$ from acid or alkaline compartment to salt compartment through anion and cation exchange membranes reduces respectively, whereby function of the electric current is improved. Furthermore, the process of this invention accompanies no oxidation or reduction due to electrode reaction.

*Example 1*

In this example, the following membranes were used.

(*a*) Cation exchange membrane: It was prepared by rolling powdery Amberlite IR-120 (polystyrol resin containing sulphonic radical) containing vinyl chloride resin as binding agent.

(*b*) Anion exchange membrane: It was prepared by rolling powdery Amberlite IR-410 (polystyrol resin containing quaternary amine radical) containing vinyl chloride resin as binding agent.

(*c*) Double membrane: It was prepared by adhering the above-mentioned cation and anion exchange membranes by means of a mixture of polyethyleneimine and epichlorhydrine and then by hardening said adhering agent.

As illustrated in the drawing attached hereto, five sheets of anion exchange membranes, five sheets of double membranes and five sheets of cation exchange membranes were successively arranged in an electrolytic cell and electrode compartment having carbon electrodes were built at both ends of said cell.

Surface area of each membrane was selected as 8 cm. x 12 cm. All of the salt compartments, acid compartments and alkaline compartments were communicated in parallel. 25 cc. of NaCl aqueous solution (0.5 N) was charged into salt compartment per minute and 10 cc. of water was charged into each of acid and alkaline compartments. Into electrode compartments also was passed NaCl aqueous solution (0.5 N) at a velocity over that of the salt solution in the salt compartments. When direct current of 2 amp. was passed through said electrodes, the voltage thereof became 14.5 volts after stationary state was reached. In this state, 10.3 cc. of the solution containing HCl (0.26 N) and NaCl (0.07 N) was obtained per minute from acid compartments and 10.5 cc. of the solution containing NaOH (0.31 N) and NaCl (0.09 N) was obtained per minute from alkaline compartments. On the other hand, NaCl aqueous solution (about 0.3 N) containing a little amount of hydrochloric acid was discharged from the salt compartments.

*Example 2*

In this example was used an apparatus which is similar to that used in Example 1 except that one salt compartment is added between the cathode compartment and its adjacent acid compartment in the Example 1. In this example, 25 cc. of sodium acetate solution (1 N), 5 cc. of water and 10 cc. of water were, respectively, charged per minute into salt compartments, acid compartments and alkaline compartments. NaCl aqueous solution (0.5 N) was passed through both electrode compartments as in the case of the Example 1.

When direct current of 2 amp. was passed through the electrodes, electric voltage between said electrodes became 24 volts after stationary state was reached. In this state, 5.4 cc. of the solution containing acetic acid (0.82 N) and sodium acetate (0.08 N), and 10.5 cc. of the solution containing NaOH (0.37 N) and sodium acetate (0.06 N) were, respectively, obtained per minute from acid compartments and alkaline compartments. Solution of sodium acetate (about 0.8 N) containing a little amount of NaOH was obtained from salt compartments.

Example 3

In this example, double membrane was prepared by pressing both elemental membranes (cation and anion exchange membranes) before vaporization of the solvent (cyclohexanone) for the vinyl chloride which was used in the preparation of elemental membranes, said cation and anion exchange membranes being, respectively, made of Amberlite IR–120 and Amberlite IR–410. Other membranes and arrangement of membranes were same as those in Example 1. 25 cc. of NaCl aqueous solution (0.5 N) was charged per minute into salt compartments and 10 cc. of water was charged, respectively, into acid and alkaline compartments per minute. When direct current of 2 amp. was passed through the electrodes, electric voltage of 16.3 volts was needed after stationary state was reached. In this state, 10.3 cc. of the solution containing HCl (0.25 N) and NaCl (0.07 N) and 10.5 cc. of the solution containing NaOH (0.28 N) and NaCl (0.08 N) were, respectively, obtained from acid and alkaline compartments. Solution of NaCl (about 0.3 N) was discharged from salt compartments.

While particular embodiments of this invention have been described and shown, it will, of course, be understood that this invention would not be limited thereto, since many modifications may be made and all such modifications are within the true spirit and scope of this invention.

We claim:

1. A process for the production of acidic and alkaline solution from salt solution by multi-compartment electrolysis, which comprises arranging a plurality of membrane groups in series in an electrolytic cell, each group consisting of an anion exchange membrane, a cation exchange membrane and an anion exchange membrane of an acid-base double membrane, both the membranes of said double membrane being made to be in close contact with each other, and a cation exchange membrane which are successively arranged in series in the above-mentioned order so as to form an electrolytic compartment between each membrane and its adjacent membrane, and carrying out electrolysis by feeding direct electric current from an electrode arranged at one end compartment of said electrolytic cell to the other electrode arranged at the other end compartment of said cell, said current being directed from the anion exchange membrane side of the double membrane towards the cation exchange membrane side of said double membrane, while charging the starting salt solution into the electrolytic compartments formed between the anion and cation exchange membranes, thus producing acidic solution in each electrolytic compartment formed between the anion exchange membrane and the double membrane, and producing alkaline solution in each electrolytic compartment between the double membrane and the cation exchange membrane.

2. A process for the production of acidic and alkaline solution from salt solution by multi-compartment electrolysis, which comprises arranging a plurality of membrane groups in series in an electrolytic cell, each group consisting of an anion exchange membrane, a strongly acidic cation exchange membrane and a strongly basic anion exchange membrane of an acid-base double membrane, both the membranes of said double membrane being made to be in close contact with each other, and a cation exchange membrane which are successively arranged in series in the above-mentioned order so as to form an electrolytic compartment between each membrane and its adjacent membrane, and carrying out electrolysis by feeding direct electric current from an electrode arranged at one end compartment of said electrolytic cell to the other electrode arranged at the other end compartment of said cell, said current being directed from the anion exchange membrane side of the double membrane towards the cation exchange membrane side of said double membrane, while charging the starting salt solution into the electrolytic compartments formed between the anion and cation exchange membranes, thus producing acidic solution in each electrolytic compartment formed between the anion exchange membrane and the double membrane, and producing alkaline solution in each electrolytic compartment between the double membrane and the cation exchange membrane.

3. A process for the production of acidic and alkaline solution from salt solution by multi-compartment electrolysis, which comprises arranging a plurality of membrane groups in series in an electrolytic cell, each group consisting of an anion exchange membrane, a cation exchange membrane and an anion exchange membrane of an acid-base double membrane, both the membranes of said double membrane being adhered by ion exchange resin, and a cation exchange membrane which are successively arranged in series in the above-mentioned order so as to form an electrolytic compartment between each membrane and its adjacent membrane, and carrying out electrolysis by feeding direct electric current from an electrode arranged at one end compartment of said electrolytic cell to the other electrode arranged at the other end compartment of said cell, said current being directed from the anion exchange membrane side of the double membrane towards the cation exchange membrane side of said double membrane, while charging the starting salt solution into the electrolytic compartments formed between the anion and cation exchange membranes, thus producing acidic solution in each electrolytic compartment formed between the anion exchange membrane and the double membrane, and producing alkaline solution in each electrolytic compartment between the double membrane and the cation exchange membrane.

4. A process for the production of acidic and alkaline solution from salt solution by multi-compartment electrolysis, which comprises arranging a plurality of membrane groups in series in an electrolytic cell, each group consisting of an anion exchange membrane, a cation exchange membrane and an anion exchange membrane of an acid-base double membrane, both the membranes of said double membrane being adhered by polyethyleneimine-epichlorohydrine resin, and a cation exchange membrane which are successively arranged in series in the above-mentioned order so as to form an electrolytic compartment between each membrane and its adjacent membrane, and carrying out electrolysis by feeding direct electric current from an electrode arranged at one end compartment of said electrolytic cell to the other electrode arranged at the other end compartment of said cell, said current being directed from the anion exchange membrane side of the double membrane towards the cation exchange membrane side of said double membrane, while charging the starting salt solution into the electrolytic compartments formed between the anion and cation exchange membranes, thus producing acidic solution in each electrolytic compartment formed between the anion exchange membrane and the double membrane, and producing alkaline solution in each electrolytic compartment between the double membrane and the cation exchange membrane.

5. A process for the production of acidic and alkaline solution from salt solution by multi-compartment electrolysis, which comprises arranging a plurality of membrane groups in series in an electrolytic cell, each group consisting of an anion exchange membrane, a cation exchange membrane and an anion exchange membrane of an acid-base double membrane, each membrane of said double membrane being made of respective ion exchange resin and binding agant such as vinylchloride and both the membranes of said double membrane being made to be close together by pressing, and a cation exchange membrane which are successively arranged in series in the above-mentioned order so as to form an electrolytic compartment between each membrane and its adjacent membrane, and carrying out electrolysis by feeding direct electric current from an electrode arranged at one end compartment of said electrolytic cell to the other electrode arranged at the other end compartment of said cell, said current being directed from the anion exchange membrane side of the double membrane towards the cation exchange membrane side of said double membrane, while charging the starting salt solution into the electrolytic compartments formed between the anion and cation exchange membrane, thus producing acidic solution in each electrolytic compartment formed between the anion exchange membrane and the double membrane, and producing alkaline solution in each electrolytic compartment between the double membrane and the cation exchange membrane.

References Cited in the file of this patent

UNITED STATES PATENTS

| | | |
|---|---|---|
| 2,502,614 | Zender | Apr. 4, 1950 |
| 2,721,171 | Arnold | Oct. 18, 1955 |